US012311631B2

(12) United States Patent
Nicolini

(10) Patent No.: US 12,311,631 B2
(45) Date of Patent: May 27, 2025

(54) ASSEMBLY AND METHOD FOR THE AUTOMATED FOLDING OF CORNERS OF A BOX

(71) Applicant: Panotec S.r.l., Cimadolmo (IT)

(72) Inventor: Luca Nicolini, Modena (IT)

( * ) Notice: Subject to any disclaimer, the term of this patent is extended or adjusted under 35 U.S.C. 154(b) by 0 days.

(21) Appl. No.: 18/561,464

(22) PCT Filed: Oct. 11, 2022

(86) PCT No.: PCT/IB2022/059721
§ 371 (c)(1),
(2) Date: Nov. 16, 2023

(87) PCT Pub. No.: WO2023/062521
PCT Pub. Date: Apr. 20, 2023

(65) Prior Publication Data

US 2024/0253320 A1 Aug. 1, 2024

(30) Foreign Application Priority Data

Oct. 11, 2021 (IT) ........................ 102021000025991

(51) Int. Cl.
*B31B 50/52* (2017.01)
*B31B 50/62* (2017.01)
*B31B 110/35* (2017.01)

(52) U.S. Cl.
CPC .............. *B31B 50/52* (2017.08); *B31B 50/62* (2017.08); *B31B 2110/35* (2017.08)

(58) Field of Classification Search
CPC ..... B31B 50/52; B31B 50/62; B31B 2110/35; B31B 2100/0024; B31B 2120/102
See application file for complete search history.

(56) References Cited

U.S. PATENT DOCUMENTS 3,196,761 A * 7/1965 Ullman .................. B31B 50/30 493/122
4,613,391 A 9/1986 Herlin
6,357,212 B1 * 3/2002 Salm ..................... B65B 59/001 53/376.4
2012/0131888 A1 * 5/2012 Pettersson .............. B31B 50/99 53/381.1
2020/0061950 A1 * 2/2020 Pettersson ............ B65D 5/4279
(Continued)

FOREIGN PATENT DOCUMENTS

AU 2005211967 5/2011
JP S63307935 12/1988

*Primary Examiner* — Anna K Kinsaul
*Assistant Examiner* — Nicholas E Igbokwe
(74) *Attorney, Agent, or Firm* — Themis Law

(57) ABSTRACT

An assembly for the automated folding of the corners of a box made of a relatively rigid laminar material, such as paper or cardboard, the box having a bottom wall, an upper wall, and two pairs of side walls, at least two walls having at least one tab to be folded to form a corner of the box, includes a first folding device to fold a first tab of at least one of the side walls along a first creasing edge, a second folding device to fold a second tab of at least one of the bottom or upper walls along a second creasing edge, and a mechanical connection kinematic mechanism between the first and the second folding device to fold the corner of the box in a coordinated manner. A method for the automated folding of a corner of a box using the assembly.

11 Claims, 4 Drawing Sheets

(56) References Cited

U.S. PATENT DOCUMENTS

| | | | | |
|---|---|---|---|---|
| 2020/0406568 | A1* | 12/2020 | Reinkensmeyer | B31B 50/262 |
| 2021/0283878 | A1* | 9/2021 | Pettersson | B31B 50/04 |
| 2022/0048651 | A1* | 2/2022 | de Jong | B65B 7/20 |

* cited by examiner

ASSEMBLY AND METHOD FOR THE AUTOMATED FOLDING OF CORNERS OF A BOX

FIELD OF THE INVENTION

The present invention generally relates to the technical field of plants for manufacturing packages and it particularly relates to an assembly for the automated folding of corners of a box.

The invention also relates to a method for the automated folding of the aforementioned corners.

STATE OF THE ART

The use of boxes obtained starting from modules or sheets made of flat relatively rigid laminar material, such as paper or corrugated cardboard, suitably shaped and folded along creasing lines has been long known in the packaging industry.

In particular, the sheets generally have generally a rectangular shape in plan view, to allow formation of a bottom wall, an upper wall and a plurality of side walls along respective longitudinal and transversal creasing lines.

The side walls are folded to form the box, which is closed at the upper part by the upper wall joined to one of the side walls.

An example of such type of box is represented by the FEFCO 410 standard in which at least two walls of the box comprise at least one wing designed to be folded to form a respective corner of the box.

Generally, such type of box is obtained by using machines which comprise means for feeding cardboard sheets and means for cutting, creasing and folding sheets along the respective longitudinal and transversal directions.

Furthermore, the corners of the box are formed using a pair of pneumatic devices designed to fold a respective wall and a respective wing of the box respectively and using a pressing device adapted to exert a pressure on the contact surface between the wall and the wing to glue it.

A first drawback of such known machines lies in the poor effectiveness of the pneumatic devices and of the pressing device thus ensuing higher production times.

Furthermore, such machines are not capable of providing an appropriate distribution of the pressure on the contact surfaces because they have an efficiency which depends on the quality of the cardboard used and the creasing lines.

In an attempt to at least partially overcome such drawbacks, machines and assemblies for the automated folding of a corner of a box comprising devices for folding at least one wall and a respective wing have been developed.

U.S. Pat. No. 3,451,317 discloses a machine for manufacturing boxes in which a creased cardboard sheet is transported by advancement means to a processing station adapted to form the corners of the box.

The station comprises a pair of rollers suitable to lift a side wall of the box at a time for positioning it at least partially vertically and a lifting element suitable to fold at least one wing of the bottom wall at a time toward the vertical side wall.

Subsequently, a gluing device applies on the facing surfaces an adhesive suitable to keep the vertical wall firmly in contact with the relative wing to obtain each corner of the box.

WO2012117339 discloses an assembly for forming the corners of a box provided with a pair of rotary elements adapted to vertically rotate a side wall of the box and horizontally rotate the respective wing to place them in contact along a contact surface.

U.S. Pat. No. 3,196,761 discloses an assembly for the automated folding of corners of a box made of laminar material, the assembly comprising one or more folding means for folding wings designed to form the corner of the box and a kinematic mechanism adapted to connect such folding means.

A drawback of such known solutions lies in the fact that the corners of the box do not have a stable structure and they tend to bend and deform over time, in particular during the required displacement and transportation steps.

Furthermore, the rollers, the lifting element and the rotary elements described above do not provide an appropriate distribution of the pressure on the flap to be folded upon variation of the height of the box.

The not last drawback of such solutions is the low efficiency and high production times, therefore they have significant disadvantages.

Technical Problem

In the light of the prior art, the technical problem addressed by the present invention is to provide an appropriate distribution of pressure on the parts of the box irrespective of the height thereof so that the latter is particularly stable and resistant.

SUMMARY OF THE INVENTION

The object of the present invention is to solve the aforementioned problem by providing an assembly for the automated folding of a corner of a box which is highly efficient and cost-effective.

A particular object of the present invention is to provide an assembly of the type described above which allows to obtain corners providing an appropriate distribution of the pressure independently from the height of the box.

Another object of the present invention is to provide an assembly of the type described above which allows to obtain corners in a constant and repeated manner guaranteeing a high-quality forming of the box.

A further object of the present invention is to provide an assembly of the type described above which allows to reduce downtime for manufacturing the box.

Another object of the present invention is to provide an assembly of the type described above which has small overall dimensions and which is particularly easy to assemble.

The objects mentioned above, as well as others which will be more apparent hereinafter, are fulfilled by an assembly for the automated folding of a corner of a box, according to claim 1, wherein the box is made of laminar material, such as paper or cardboard, and comprises a bottom wall, an upper wall and two pairs of side walls, wherein at least two walls of the box comprise at least one wing designed to be folded to form a corner of the box.

The assembly comprises first folding means to fold a first wing of at least one of the side walls of the box along a first creasing edge, and second folding means to fold a second wing of at least one of the bottom wall or of the upper wall of the box along a second creasing edge.

Furthermore, a mechanical kinematic mechanism is provided for connection between the first and the second folding means for folding the corner of the box in a coordinated manner.

Advantageously, first substantially horizontal guides and second substantially vertical guides are provided which are adapted to respectively guide a first and a second slide mutually connected by the mechanical kinematic mechanism to promote the synchronised actuation of the first and second folding means.

Given that the first and the second folding means are interconnected by a mechanical kinematic mechanism, the latter allows to increase the superimposition precision between the first and the second wing as well as to coordinate the movement of the first and of the second folding means.

Conveniently, the first folding means comprise a device for rotating at least one substantially horizontal which rotates by a predetermined angle of at least 90° and the second folding means comprise a pusher device selected from the group comprising a wheel or roller, a shaped sheet, a bristle brush or similar means.

This allows to fold the corners of the box providing an appropriate distribution of the pressure independently from the height of the box with ensuing production of a box having a particularly stable and resistant structure.

The invention also relates to a method for the automated folding of a corner of a box according to the invention as claimed in claim 11.

Advantageous embodiments of the invention are attained according to the dependent claims.

BRIEF DESCRIPTION OF THE DRAWINGS

Further characteristics and advantages of the invention will be more apparent in the light of the detailed description of a preferred but not exclusive embodiment of an assembly for the automated folding of a corner of a box illustrated by way of non-limiting example with reference to the drawings below, wherein.

DETAILED DESCRIPTION OF A PREFERRED EMBODIMENT

Figure 1:
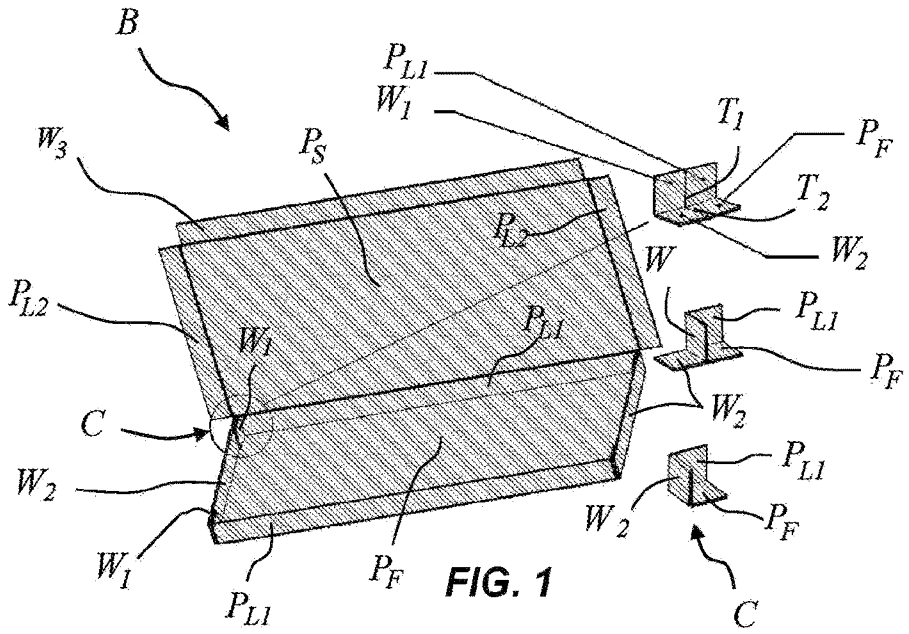
FIG. 1 is a schematic perspective view of a box wherein the corners are folded in an automated manner by the assembly according to the invention.

With reference to the figures, there is shown an assembly globally indicated with reference numeral 1, for folding the corners C of a box B made of relatively rigid laminar material, such as paper or corrugated cardboard.

In particular, as better outlined in FIG. 1, the box B comprises, in the assembled configuration thereof, a bottom wall $P_F$, an upper closing wall $P_S$ and two pairs of side walls $P_{L1}$, $P_{L2}$ substantially perpendicular to the former walls to define a containment compartment.

At least two walls $P_F$, $P_{L1}$; $P_{L2}$, $P_S$ of the box B comprise at least one first wing $W_1$ or one second wing $W_2$ designed to be folded to form respective corners C of the box B.

By way of example, the box B which can be assembled by the assembly 1 may be of the type according to the FEFCO 410 standard in which the bottom wall $P_F$ comprises a pair of second wings $W_2$, each side wall $P_{L1}$ comprises a pair of first wings $W_1$, and wherein the upper wall $P_S$ comprises a pair of side walls $P_{L2}$, which can be superimposed to the second wings $W_2$, and a third wing $W_3$ orthogonal to the respective two wings $W_1$, $W_2$ and which can be superimposed to a side wall $P_{L1}$.

In the example shown in FIG. 1, each corner C of the box B may be formed by the superimposition of a first wing $W_1$ of a side wall $P_{L1}$ with a second wing $W_2$ of the bottom wall $P_F$.

Figure 2:
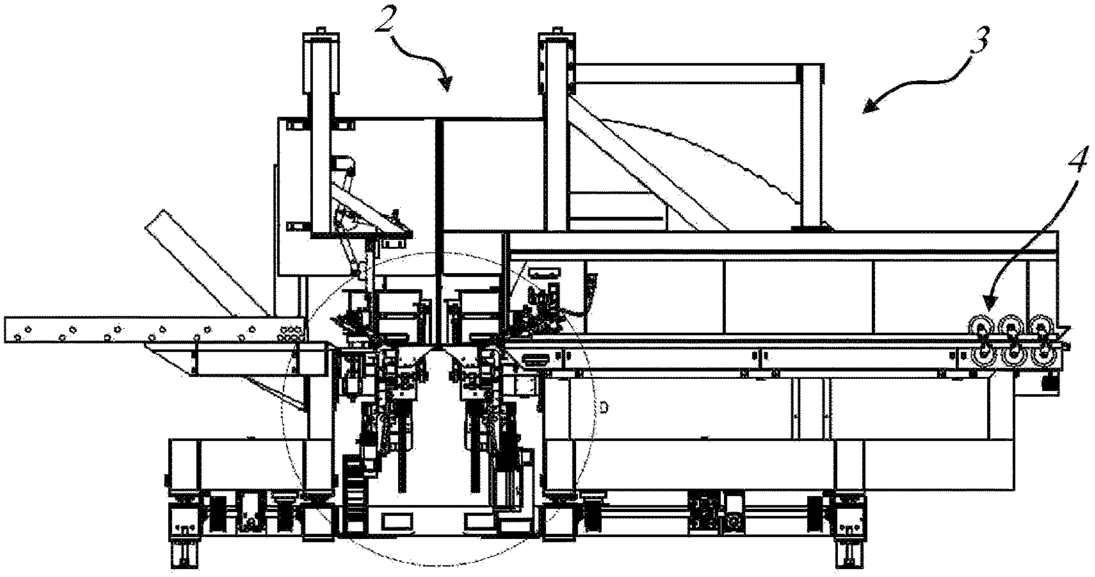
FIGS. 2 and 3 are respectively a broken-away lateral view and an enlarged view of a machine provided with at least one assembly according to the invention.
Figure 3:
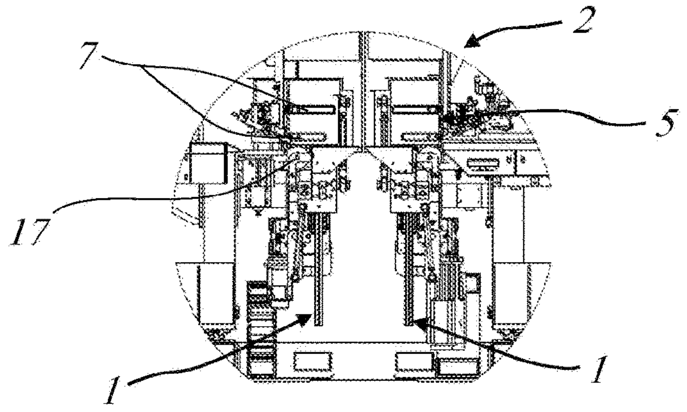

As better shown in FIGS. 2 and 3, the assembly 1 may be installed in a forming and closing station 2 of an automatic machine 3 suitable to obtain a box B starting from a continuous cardboard module and comprising further cutting and creasing stations, not shown in the figures.

The machine 3 may comprise advancing means 4 for advancing the box B along a predetermined folding and forming path of the automatic machine 3 and an assembly 1 for each corner C of the box B, to speed up the production times of the latter.

In the embodiment shown in the figures, the machine 3 comprises four assemblies 1 according to the invention, wherein two, shown in FIGS. 2 and 3, are adapted to superimpose the first wings $W_1$ of a side wall $P_{L1}$ with a portion of the second wing $W_2$ of the bottom wall $P_F$, while the other two assemblies 1, arranged in a mirror-like fashion with respect to the former and not shown in the figures, are adapted to superimpose the first wings $W_1$ of the other side wall $P_{L1}$ with the other portion of the second wing $W_2$ of the bottom wall $P_F$.

Obviously, other four assemblies 1 may be provided for the other corners C of the upper wall $P_S$ of the box B, not shown in the figures.

In a preferred embodiment of the invention, the assembly 1 comprises first folding means 5 to fold a first wing $W_1$ of at least one of the side walls $P_{L1}$, $P_{L2}$ of the box B along a first creasing edge $T_1$.

The first folding means 5 comprise a rotation device 6 of at least one substantially horizontal leaf 7 suitable to interact by contact with the first wing $W_1$ of the side wall $P_{L1}$, $P_{L2}$ so as to fold it toward the containment compartment of the box B.

Figure 4:
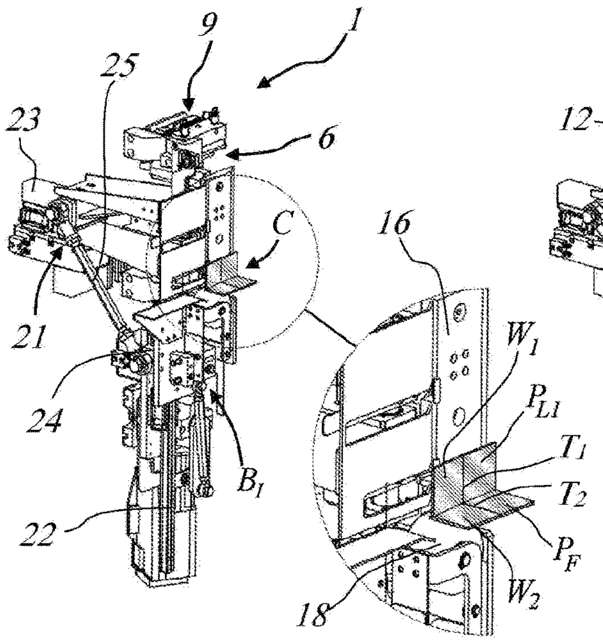
FIGS. 4 to 7 are perspective views and enlarged views of the assembly according to the invention in different operative positions.
Figure 5:
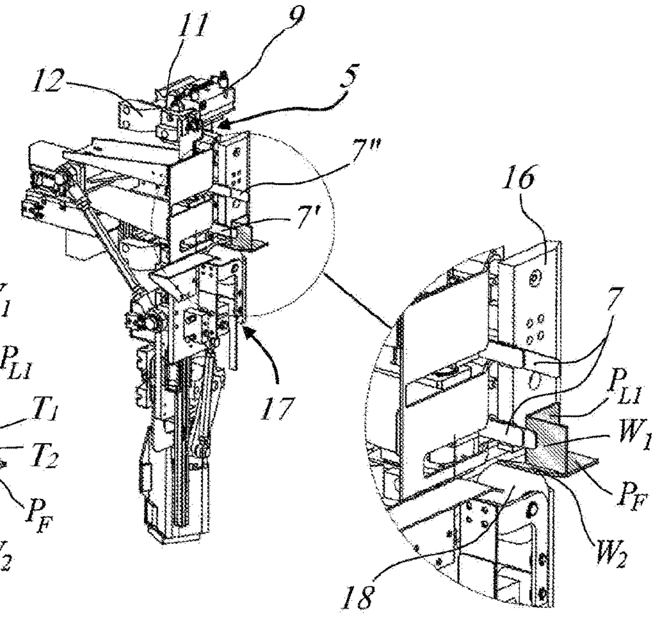

Conveniently, the rotation device 6 arranges the leaf 7 so as to form a predetermined angle of at least 90° with respect to the side wall $P_{L1}$, $P_{L2}$ in order to position the first wing $W_1$ in a manner substantially orthogonal to the side wall $P_{L1}$, $P_{L2}$ as better shown in FIGS. 4, 5.

Preferably, the at least one leaf 7 may be made of harmonic metallic material.

Figure 8:
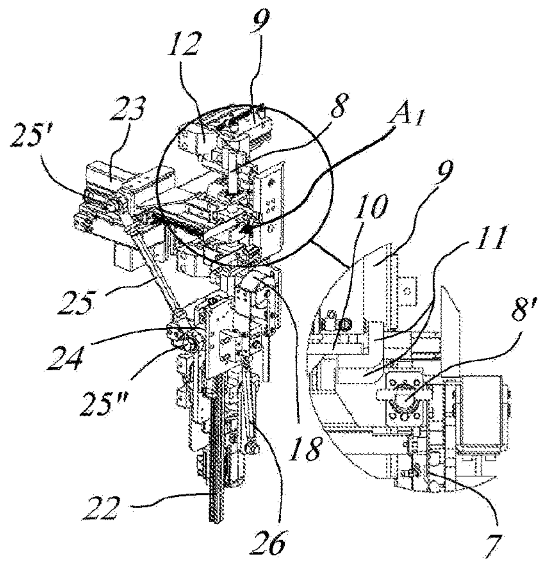
FIGS. 8 to 13 are respectively a perspective view and a top enlarged view of the assembly of FIG. 4 in different operative positions.
Figure 9:
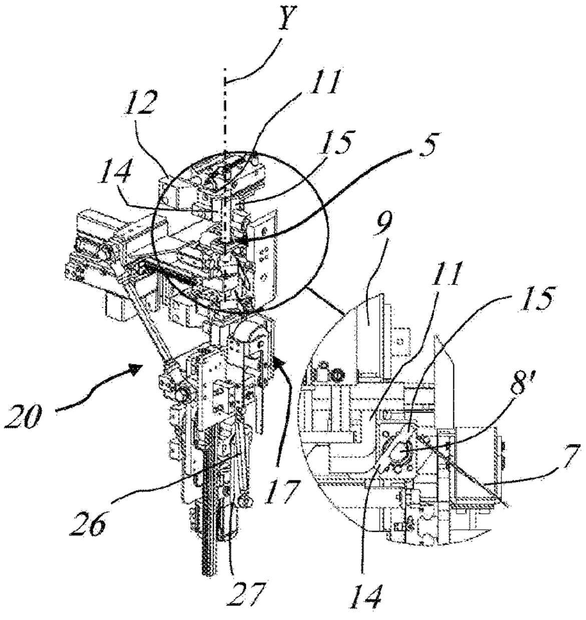
Figure 10:
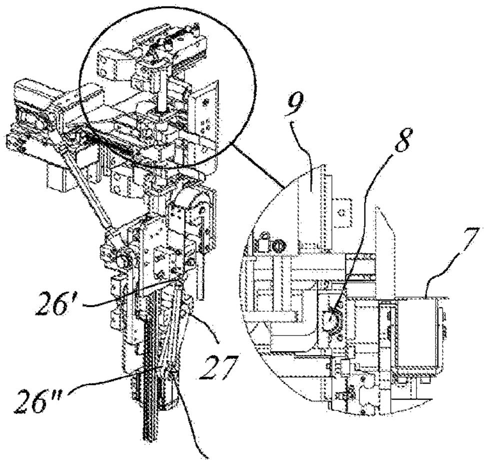

As better shown in FIGS. 8 to 10, the rotation device 6 comprises a shaft 8 rotatable around a substantially vertical axis Y onto which a leaf 7 is welded or keyed.

The shaft 8 is driven in rotation by automatic rotation means 9 of the type selected from the group comprising a pressurised air cylinder or a cam shaft with suitably configured cams.

In the embodiment shown in the figures, the automatic rotation means 9 are of the compressed air cylinder type and they are adapted to push a thrust member 10 which comprises a first 11 and a second contact portion 12 suitable to interact with a first end 8' of the shaft 8.

The first end 8' may comprise a plate-like element 13 substantially orthogonal to the shaft 8 and having a third 14 and fourth contact portion 15 respectively designed to interact with the first 11 and second contact portion 12 of the thrust member 10 so as to rotate the shaft 8 and the at least one leaf 7.

In other words, the first contact portion 11 of the thrust member 10 interacts with the third contact portion 14 of the plate-like element 13 so as to fold the first wing $W_1$ toward the containment compartment of the box B, while the second contact portion 12 of the thrust member 10 interacts with the fourth contact portion 15 of the plate-like element 13 so as to position the leaf 7 in the position which is initial and distal from the first wing $W_1$.

Advantageously, there may be provided at least one abutment device 16 which can be positioned in proximity of the first wing $W_1$ so as to interact with at least one of the side walls $P_{L1}$, $P_{L2}$ and improve the formation of the corner C of the box B along the first creasing edge $T_1$, as shown in FIGS. 5 and 8.

Furthermore, second folding means 17 are provided for folding a second wing $W_2$ of at least one of the bottom wall $P_F$ or of the upper wall $P_S$ of the box B along a second creasing edge $T_2$.

The second folding means 17 comprise a pusher device 18 selected from the group comprising a wheel or roller, a shaped sheet, a bristle brush or similar contact means.

Figure 6:
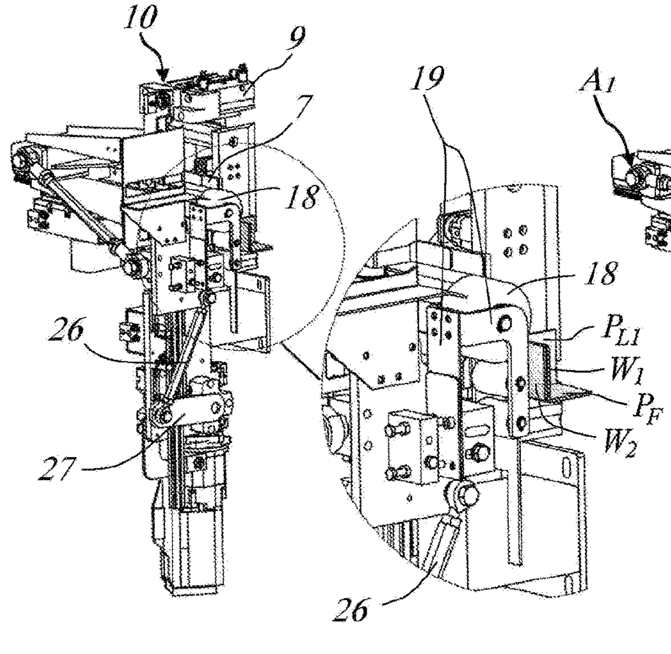
Figure 7:
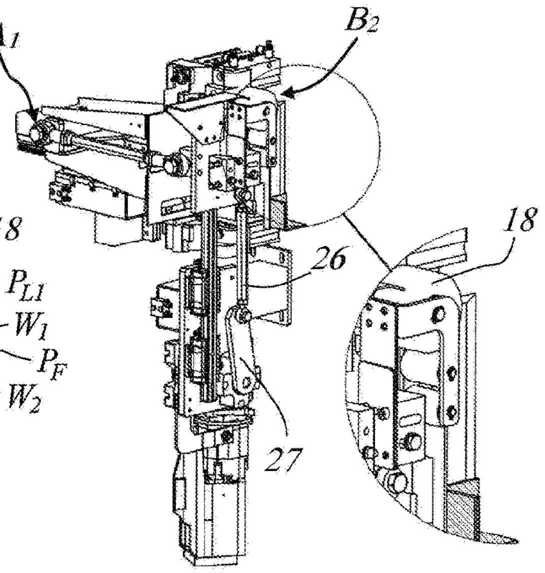

In the embodiment shown in the figures, the pusher device 18 is of the roller type and it is moved in the vertical direction to push the second wing $W_2$ of the bottom wall $P_F$ or of the upper wall $P_S$ so as to fold the second wing $W_2$ toward the inner compartment of the box B by a predetermined angle of at least 90° with respect to the bottom wall $P_F$ and to position it in contact with the first wing $W_1$, as better shown in FIGS. 6 and 7.

The pusher device 18 is constrained to a pair of plates 19, preferably made of harmonic material, so as to force it to remain constantly in contact with the second wing $W_2$ when folding the latter.

Suitably, an applicator device, not shown in the figures, is provided for applying an adhesive on at least one of the first $W_1$ and the second wing $W_2$ so as to allow the mutual gluing thereof.

Advantageously, the assembly 1 comprises a mechanical kinematic mechanism 20 for connecting the first 5 and second folding means 17 adapted to fold the first $W_1$ and the second wing $W_2$ and therefore the corner C of the box B in a coordinated and synchronous manner, as better described below.

The assembly 1 comprises first substantially horizontal guides 21 and second substantially vertical guides 22 suitable to respectively guide a first 23 and a second slide 24 mutually connected by the kinematic mechanism 20 so as to promote the synchronised actuation of the first 5 and second folding means 17, as better shown in FIGS. 8 to 12.

The first 21 and second guides 22 may be selected from the group comprising one or more tracks, recirculating ball screws, cylindrical drum cams or similar means.

Furthermore, the kinematic mechanism 20 may be of the type selected from the group comprising connecting rod-crank, swinging glyph, pinion-rack or belt mechanisms or the like.

In the embodiment shown in the figures, the first 21 and the second guides 22 are of the track type and the kinematic mechanism 20 is an articulated mechanism which comprises an arm 25 having two ends 25', 25" hinged to the first 23 and second slide 24 respectively.

Furthermore, the kinematic mechanism 20 comprises a connecting rod 26 having two ends 26', 26" respectively hinged to the second slide 24 and to the external end 27' of a crank 27 which has an internal end 27" driven in rotation by motor means 28 of the known type.

In use, the rotation motion of the crank 27 is transformed into a reciprocating translation motion of the second slide 24 in the vertical direction which, through the arm 25, reciprocatingly translates the first slide 23 in the horizontal direction.

As shown in the figures, the rotation device 6 is constrained to the first slide 23 to move the at least one leaf 7 along the first guides 21 and away from the first wing $W_1$ so as to allow the pusher device 18 to fold the second wing $W_2$ on the first wing $W_1$ without superimposing it to the leaf.

As a result, the mechanical kinematic mechanism 20 is suitable to cyclically and sequentially move the first 23 and the second slide 24 respectively between a first $A_1$ and a second end position $A_2$ and between a first $B_1$ and a second end-stroke position $B_2$.

The assembly 1 comprises a central control unit, not shown in the figures, adapted to coordinate the movement of the abutment device 16, of the automatic rotation means 9 and of the motor means 28.

Figure 11:
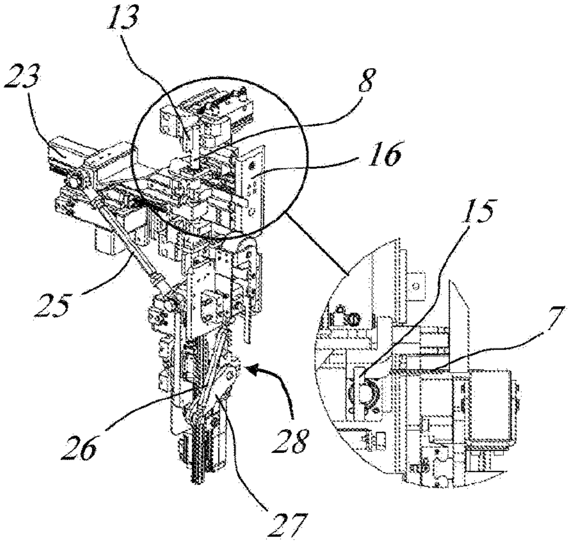
Figure 12:
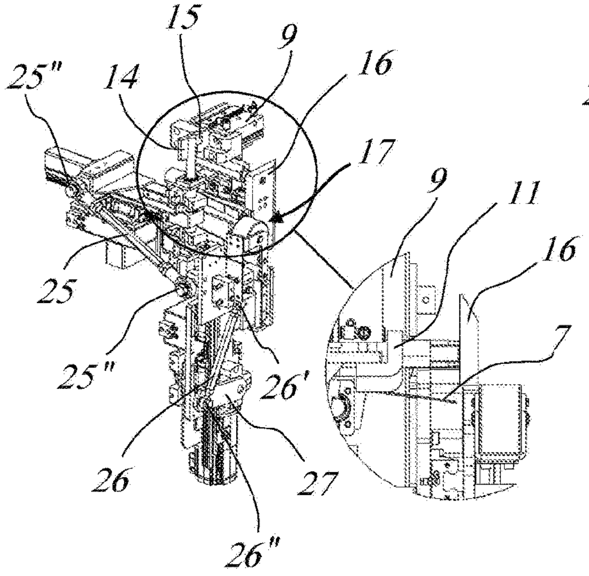
Figure 13:
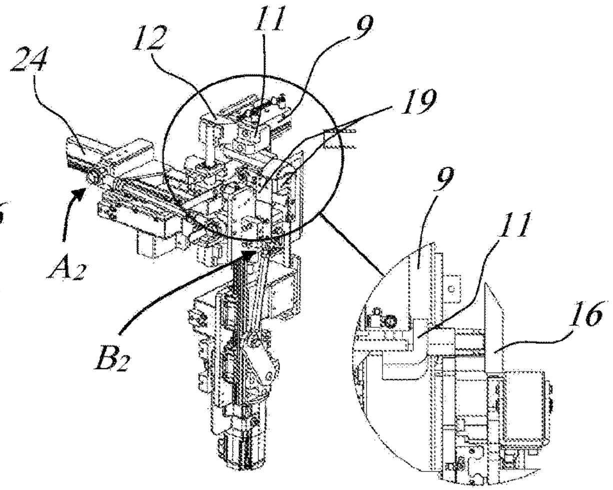

In other words, when the second slide 24 is in the first end-stroke position $B_1$, the first slide 23 is in the first end position $A_1$ and the central control unit is actuated to activate the components of the assembly 1 which are moved in the order below:

- the abutment device 16 is activated, as shown in FIG. 8;
- the automatic rotation means 9 push the first contact portion 11 of the thrust member 10 which, interacting with the third contact portion 14 of the plate-like element 13, rotate the shaft 8 and the leaf 7 toward the containment compartment of the box B folding the first wing $W_1$ of one of the side walls $P_{L1}$, $P_{L2}$, as shown in FIGS. 9 and 10;
- the motor means 28 translate the second slide 24 in the vertical direction toward the second end-stroke position $B_2$ and, through a kinematic mechanism 20, they translate the first slide 23 in the horizontal direction toward the second end position $A_2$, which drives along with it the first folding means 5, as shown in FIGS. 11 and 12;
- the pusher device 18 interacts with the second wing $W_2$ of the bottom wall $P_F$ or of the upper wall $P_S$ so as to fold it toward the containment compartment of the box B, as shown in FIGS. 11 to 13;
- the second contact portion 12 of the thrust member 10 interacts with the fourth contact portion 15 of the plate-like element 13, rotating the shaft 8 and the leaf 7 in the direction which is opposite to and distal from the first folded wing $W_1$, as shown in FIGS. 12 and 13.

At this point, a corner C of the box B is fully folded and the advancement means 4 of the machine 3 translate the box B outside the forming station 2 so as to fold a corner C of the subsequent box B.

In an alternative embodiment, not shown in the figures, the automatic rotation means 9 are of the cam shaft type suitably shaped and driven by the mechanical kinematic mechanism 20.

It is clear that the interconnection between the first 5 and the second folding means 17 through the kinematic mechanism 20 allows to increase the superimposition precision between the first wing $W_1$ and the second wing $W_2$ as well as the coordination of the folding means 5, 17.

In a preferred embodiment of the invention, shown in the figures, the first folding means 5 comprise two leafs 7', 7" spaced from each other along the shaft 8 and wherein a leaf 7' is proximal to the second wing $W_2$ and it is shorter than the other leaf 7" which is in a distal position with respect to the second wing $W_2$.

In this way, when actuating the pusher device 18 along the surface of the second wing $W_2$ and the sliding of the first slide 13 toward the second end position $A_2$, the leaf 7' may move away from the corner C of the box while the other leaf 7" remains in contact with the first wing $W_1$, as better shown in FIGS. 6 and 11.

It is clear that the assembly 1 allows to fold the corners C of the box B providing an appropriate distribution of the pressure independently from the height of the box B with ensuing production of boxes provided with a particularly stable and resistant structure.

According to a further peculiar aspect of the invention, there is provided a method for the automated folding of a corner C of a box B using an assembly 1, which method comprises the following steps:

actuating the abutment device 16 against at least one of the side walls $P_{L1}$, $P_{L2}$ of the box B;

actuating the first folding means 5 for the first wing $W_1$ of at least one of the side walls $P_{L1}$, $P_{L2}$ of the box B along a first creasing edge $T_1$;

connecting the first 5 with the second folding means 17 through the mechanical kinematic mechanism 20 so as to fold the corner C of the box B in a coordinated manner;

actuating the first slide 23 along the first guides 21 so as to move away the first folding means 5 from the first wing $W_1$;

actuating the second slide 24 along the second guides 22 and the second folding means 17 for the second wing $W_2$ of at least one of the bottom wall $P_F$ or of the upper wall $P_S$ of the box B along the second creasing edge $T_2$;

folding the second wing $W_2$ on the first wing $W_1$.

In the light of the above, it is clear that the assembly and the method for the automated folding of a corner of a box according to the invention achieve the pre-established objects and in particular they allow to provide an appropriate distribution of the pressure independently from the height of the box so that the latter is particularly stable and resistant.

The assembly and the method according to the invention are susceptible to numerous modifications and variants all falling within the inventive concept expressed in the attached claims.

Although the assembly according to the invention has been described with particular reference to the attached figures, the reference numerals used in the description and in the claims are meant to improve the intelligibility of the invention and thus do not limit the claimed scope of protection in any manner whatsoever.

Throughout the description, reference to "an embodiment" or "the embodiment" or "some embodiments" indicate that a particular characteristic, structure or element described is included in at least one embodiment of the object of the present invention.

Furthermore, the particular characteristics, structures or elements may be combined in any appropriate fashion in one or more embodiments.

INDUSTRIAL APPLICABILITY

The present invention is applicable at industrial level because it can be produced in an industrial scale by industries belonging to the field of packaging machines.

The invention claimed is:

1. An assembly (1) for automated folding of corners (C) of a box (B) made of a laminar material, wherein the box (B) comprises a bottom wall ($P_F$), an upper wall ($P_S$) and two pairs of side walls ($P_{L1}$, $P_{L2}$), and wherein at least two walls of the box ($P_F$, $P_{L1}$, $P_{L2}$, $P_S$) comprise at least one pair of wings ($W_1$, $W_2$) designed to be folded to form a respective corner (C) of the box (B), the assembly (1) comprising:

first folding means (5) to fold a first wing ($W_1$) of at least one of the side walls ($P_{L1}$, $P_{L2}$) of the box (B) along a first creasing edge ($T_1$);

second folding means (17) to fold a second wing ($W_2$) of at least one of the bottom wall ($P_F$) or of the upper wall ($P_S$) of the box (B) along a second creasing edge ($T_2$);

a kinematic mechanism (20) for connecting said first (5) and said second folding means (17), the kinematic mechanism being configured to fold the corner (C) of the box (B) in a coordinated manner;

wherein first horizontal guides (21) and second vertical guides (22) are provided to guide respectively a first (23) and a second slide (24) mutually connected by said kinematic mechanism (20) to promote a synchronized actuation of said first (5) and said second folding means (17).

2. The assembly as claimed in claim 1, wherein said kinematic mechanism (20) is configured to cyclically and sequentially connect said first (23) and said second slide (24) movable between a first ($A_1$) and a second end position ($A_2$) and between a first ($B_1$) and a second end-stroke position ($B_2$).

3. The assembly as claimed in claim 1, wherein said first folding means (5) comprise at least one horizontal leaf (7) configured to interact with the first wing ($W_1$) of the at least one of the side walls ($P_{L1}$, $P_{L2}$) so as to fold the at least one of the side walls toward an interior of the box (B).

4. The assembly as claimed in claim 3, wherein said second folding means (17) comprise a pusher device (18) selected from the group consisting of a wheel or roller, a shaped sheet, or a bristle brush.

5. The assembly as claimed in claim 4, further comprising a rotation device (6) constrained to said first slide (23) to move said at least one horizontal leaf (7) along said first guides (21) and away from the first wing ($W_1$) to allow said pusher device (18) to interact with the second wing ($W_2$) so as to superimpose the second wing to the first wing ($W_1$).

6. The assembly as claimed in claim 5, wherein said rotation device (6) is moved by automatic rotation means (9) selected from the group consisting of an air cylinder or a cam shaft.

7. The assembly as claimed in claim 1, further comprising a glue applicator device for applying glue on at least one of the first ($W_1$) and the second wing ($W_2$) to allow a mutual gluing thereof.

8. The assembly as claimed in claim 1, further comprising at least one abutment device (16) which can be positioned in adjacently to the first wing ($W_1$) for interacting with at least one of the side walls ($P_{L1}$, $P_{L2}$) of the box (B) to block the at least one of the side walls and improve a formation of the corner (C) along the first creasing edge ($T_1$).

9. The assembly as claimed in claim 1, wherein said kinematic mechanism (20) is selected from the group consisting of a connecting rod-crank mechanisms, a swinging glyph, a pinion-rack, or a belt.

10. The assembly as claimed in claim 1, wherein said first (21) and said second guides (22) comprise one or more tracks, or alternatively a recirculating ball screw, or a cylindrical drum cam.

11. A method for automated folding of corners (C) of a box (B) using an assembly (1) according to claim 8, the method comprising:

actuating said at least one abutment device (16) against at least one of the side walls ($P_{L1}$, $P_{L2}$) of the box (B);

actuating said first folding means (5) for the first wing ($W_1$) of at least one of the side walls ($P_{L1}$, $P_{L2}$) of the box (B) along a first creasing edge ($T_1$);

actuating said first slide (23) along said first guides (21) so as to move away said first folding means (5) from the first wing ($W_1$);

actuating said second slide (24) along said second guides (22) and said second folding means (17) for the second wing ($W_2$) of at least one of the bottom wall ($P_F$) or of the upper wall ($P_S$) of the box (B) along a second creasing edge ($T_2$);

folding the second wing ($W_2$) on the first wing ($W_1$);

actuating said kinematic mechanism (20) for a connection between said first (5) and said second folding means (17) so as to move said first (5) and said second folding means (17) and fold the corner (C) of the box (B) in the coordinated manner;

mutually connecting said first (23) and said second slide (24) by said kinematic mechanism (20) to promote the synchronized actuation of said first (5) and said second folding means (17); and actuating motor means (28) to translate said second slide (24) vertically and said first slide (23) horizontally by said kinematic mechanism (20).

* * * * *